US007751851B2

(12) United States Patent
Lee et al.

(10) Patent No.: US 7,751,851 B2
(45) Date of Patent: Jul. 6, 2010

(54) METHOD FOR MANAGING SCHEDULE IN MOBILE COMMUNICATION TERMINAL

(75) Inventors: Woo-Jin Lee, Seoul (KR); Yong-Nam Kim, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 1138 days.

(21) Appl. No.: 10/287,197

(22) Filed: Nov. 4, 2002

(65) Prior Publication Data
US 2003/0087668 A1 May 8, 2003

(30) Foreign Application Priority Data
Nov. 6, 2001 (KR) .......................... 10-2001-68967

(51) Int. Cl.
*H04M 1/00* (2006.01)
(52) U.S. Cl. ................. 455/556.1; 455/414.1; 455/418; 455/550.1
(58) Field of Classification Search .............. 455/412.1, 455/412.2, 414.1, 414.2, 418, 466, 566
See application file for complete search history.

(56) References Cited

U.S. PATENT DOCUMENTS

| 4,253,088 | A | * | 2/1981 | Sado et al. ................. 708/112 |
| 5,764,597 | A | * | 6/1998 | Shih ............................ 368/29 |
| 5,790,974 | A | * | 8/1998 | Tognazzini .............. 455/456.5 |
| 5,960,326 | A | * | 9/1999 | Kido ........................... 340/7.1 |
| 6,047,260 | A | * | 4/2000 | Levinson ....................... 705/9 |
| 6,317,593 | B1 | * | 11/2001 | Vossler .................... 455/414.1 |
| 6,477,365 | B2 | * | 11/2002 | Fukuda ....................... 455/415 |
| 6,484,033 | B2 | * | 11/2002 | Murray .................... 455/456.3 |
| 6,738,635 | B1 | * | 5/2004 | Lewis et al. ................. 455/466 |
| 6,819,922 | B1 | * | 11/2004 | Janz ........................... 455/420 |
| 6,829,478 | B1 | * | 12/2004 | Layton et al. ............... 455/428 |
| 6,839,733 | B1 | * | 1/2005 | Lange et al. ................ 709/202 |
| 2002/0119807 | A1 | * | 8/2002 | Lee et al. ..................... 455/567 |
| 2003/0045301 | A1 | * | 3/2003 | Wollrab ...................... 455/456 |
| 2003/0083051 | A1 | * | 5/2003 | Ntende ....................... 455/414 |

* cited by examiner

*Primary Examiner*—Charles N Appiah
*Assistant Examiner*—Jaime M Holliday
(74) *Attorney, Agent, or Firm*—The Farrell Law Firm, LLP

(57) ABSTRACT

A method for managing a schedule as a supplementary function of a mobile communication terminal. The method is capable of efficiently managing schedule information such as anniversaries to be repeated every year. Further, the method is capable of conveniently making contact with another party by providing telephone numbers of the other party at the same time when the schedule information is provided to a user.

12 Claims, 7 Drawing Sheets

METHOD FOR MANAGING SCHEDULE IN MOBILE COMMUNICATION TERMINAL

PRIORITY

This application claims priority to an application entitled "METHOD FOR MANAGING SCHEDULE IN MOBILE COMMUNICATION TERMINAL", filed in the Korean Industrial Property Office on Nov. 6, 2001 and assigned Serial No. 2001-68967, the contents of which are herein incorporated by reference.

BACKGROUND OF THE INVENTION

1. Field of the Invention

The present invention relates to a method for managing a schedule as a supplementary function of a mobile communication terminal, and more particularly to a method for managing a periodically repeated schedule.

2. Description of the Related Art

As mobile communication terminals become popularized, a variety of supplementary functions as well as primary functions such as telephone communications or data communications are improved and added to the mobile communication terminal. A schedule management function as one of the supplementary functions acts to manage a user's schedule such as appointments, birthdays, etc. Conventionally, in the schedule management function, the mobile communication terminal registers schedule and alarm time information in response to a user's input, generates an alarm at an alarm time and displays the registered schedule information.

However, the mobile communication terminal based on a conventional schedule management function deletes or cancels the registered schedule or alarm time information to be provided to a user once the schedule or the alarm time has passed. Accordingly, there is a problem that the user should annually register an anniversary such as a birthday, a memorial day, etc. to be repeated every year in the mobile communication terminal. Further, where the user needs to make contact with another party according to the schedule, there is a disadvantage in that the user must search for telephone numbers of the other party after confirming the schedule and then must establish communication with the other party or transmit a short message through the mobile communication terminal.

SUMMARY OF THE INVENTION

Therefore, the present invention has been made in view of the above problems, and it is an aspect of the present invention to provide a method for conveniently managing schedule information such as anniversaries which are periodically repeated on a yearly basis.

It is another aspect of the present invention to provide a schedule management method for conveniently making contact with another party when registered schedule information is confirmed.

In accordance with one aspect of the present invention, the above and other aspects can be accomplished by providing a method for managing a schedule in a mobile communication terminal, comprising the steps of: registering schedule information; determining whether the registered schedule information exists; determining whether a current time matches an alarm generation time for the registered schedule information; generating a pre-set alarm if the current time matches the alarm generation time; e) searching for a list of telephone numbers previously stored, simultaneously displaying the registered schedule information and a telephone number related to a name of a person if the name corresponding to the registered schedule information exists among names registered in the list of telephone numbers; and dialing the telephone number if a user selects the telephone number to request a call connection through the telephone number.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail with reference to the annexed drawings. In the following description, a detailed description of known functions and configurations incorporated herein will not be described as it will unnecessarily obscure the present invention.

The present invention relates to a schedule management method according to a schedule management function to be implemented in a mobile communication terminal. The schedule is divided into a repeated schedule and a general schedule to help understand the present invention. The repeated schedule means a schedule which is repeated on the same date every year. For example, the repeated schedule corresponds to a birthday, a memorial day, a wedding anniversary, etc. The general schedule means a one-time scheduled event such as general appointments, except for the repeated schedule.

Figure 1:
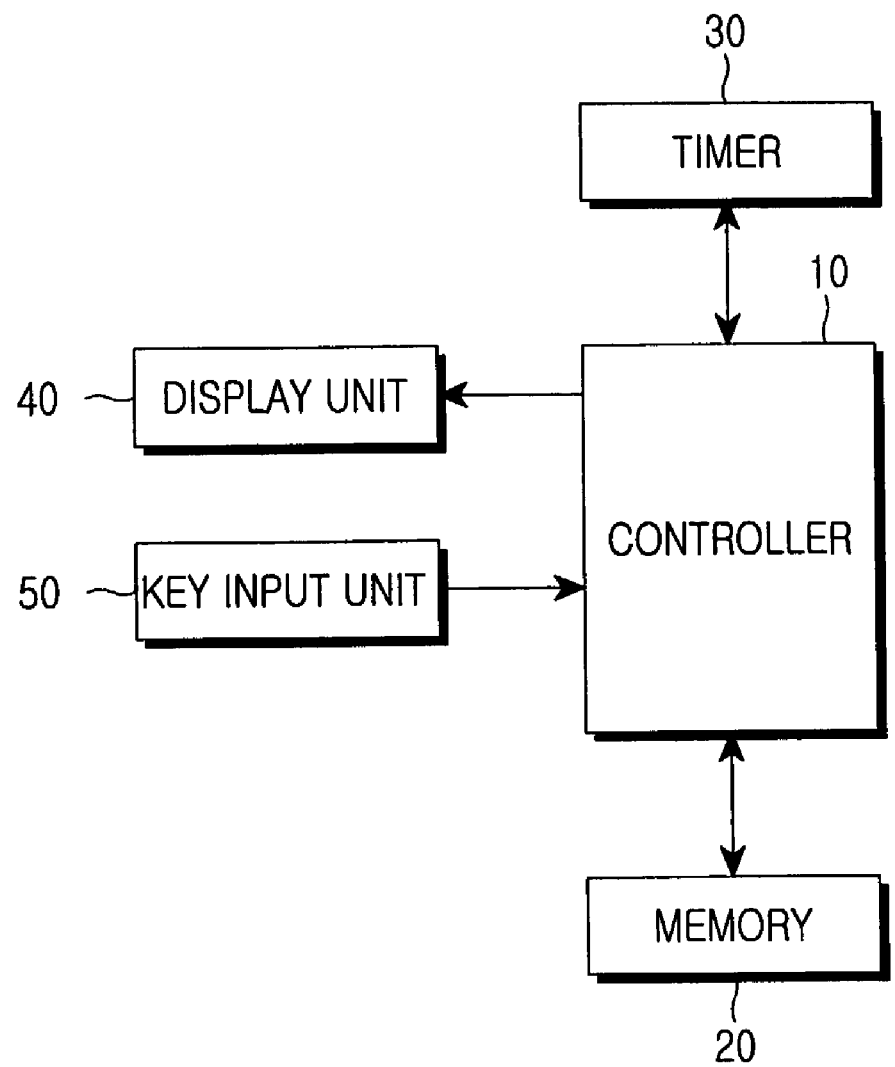
FIG. 1 is a block diagram showing a mobile communication terminal applicable to the present invention.

FIG. 1 is a block diagram showing a mobile communication terminal applicable to the present invention. With reference to FIG. 1, a controller 10 carries out an overall control operation of the mobile communication terminal. A memory 20 stores program data necessary for controlling an operation of the mobile communication terminal, and data to be generated when the mobile communication terminal is controlled or data inputted by a user. Further, the memory 20 additionally stores program data for a repeated schedule management menu and program data for converting lunar calendar information to solar calendar information in accordance with the present invention. When schedule information is registered in the mobile communication terminal, a timer 30 compares a current time with an alarm time of the registered schedule information under control of the controller 10. If the current time matches the alarm time, the timer 30 outputs data indicating the alarm time to the controller 10. At this time, if the registered schedule information under control of the controller 10 is repeated schedule information, the timer 30 compares the current time with the month, day, and hour information of an alarm time of the repeated schedule information set when the repeated schedule information is registered. On the other hand, if the registered schedule information is general schedule information, the timer 30 compares the current time with the year, month, day, and hour information of an alarm time of the general schedule information set when the general schedule information is registered. A key input unit 50 has a plurality of numeral keys, function keys, etc. and the key input unit 50 outputs key input data corresponding to a key pressed by a user. A display unit 40 displays a variety of characters and icons, etc, under control of the controller 10. Further, the display unit 40 displays data by providing a repeated schedule management menu in accordance with the present invention.

The repeated schedule management menu to be added to the mobile communication terminal in accordance with the present invention is a menu which is provided to register and manage an anniversary such as a birthday, a memorial day, etc. to be repeated on the same date every year or a schedule in the mobile communication terminal and to provide the registered repeated schedule information to the user at a set time. Further, according to the repeated schedule management menu, the registered schedule information is not deleted but continuously maintained after the date of the anniversary. Thus, the registered schedule information can be provided to the user on the same date every year. The repeated schedule management menu in an embodiment of the present invention is added to the mobile communication terminal as a lower menu of a schedule management menu.

Figure 2:
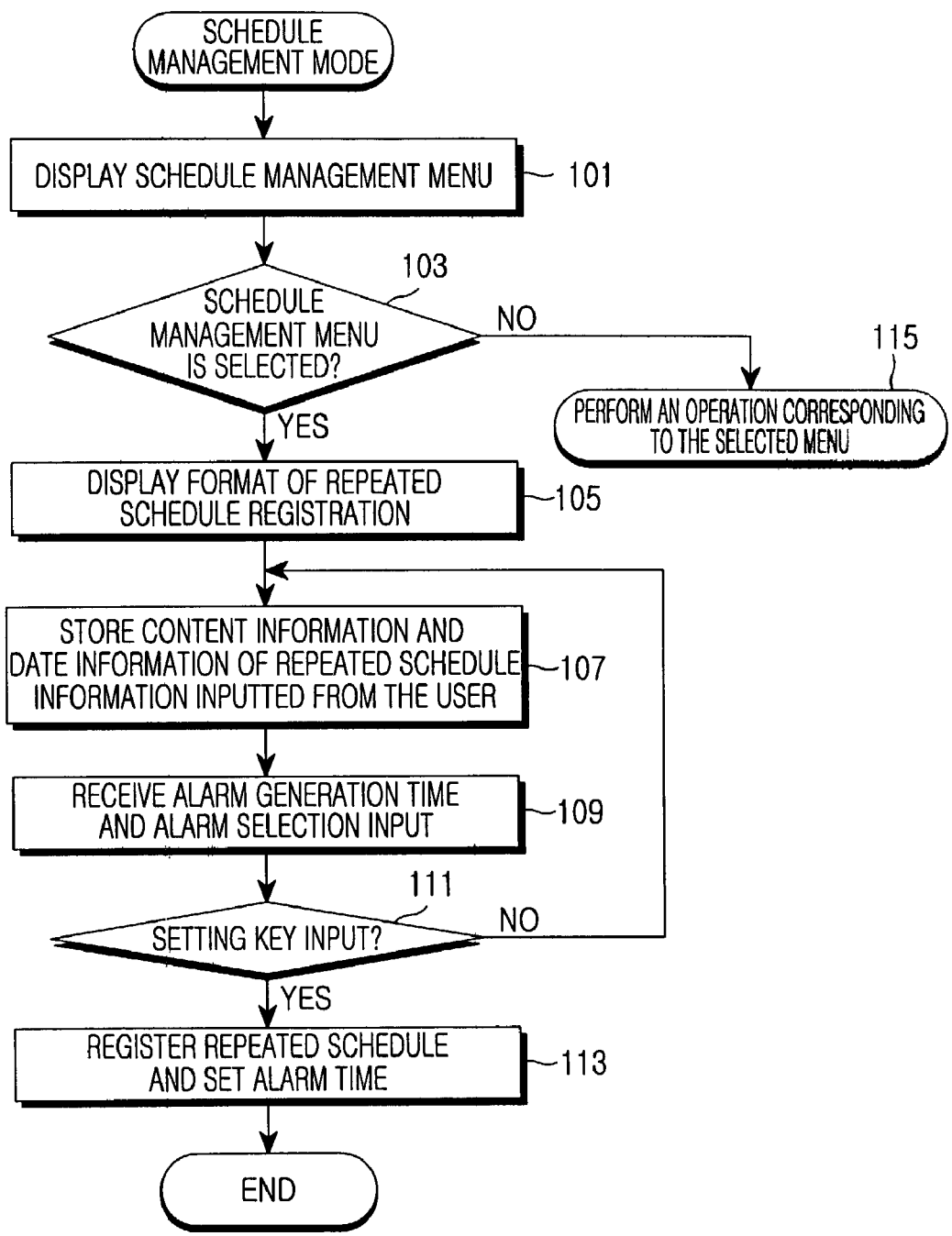
FIG. 2 is a flow chart describing a procedure of registering repeated schedule information by a controller in accordance with the present invention.
Figure 3:
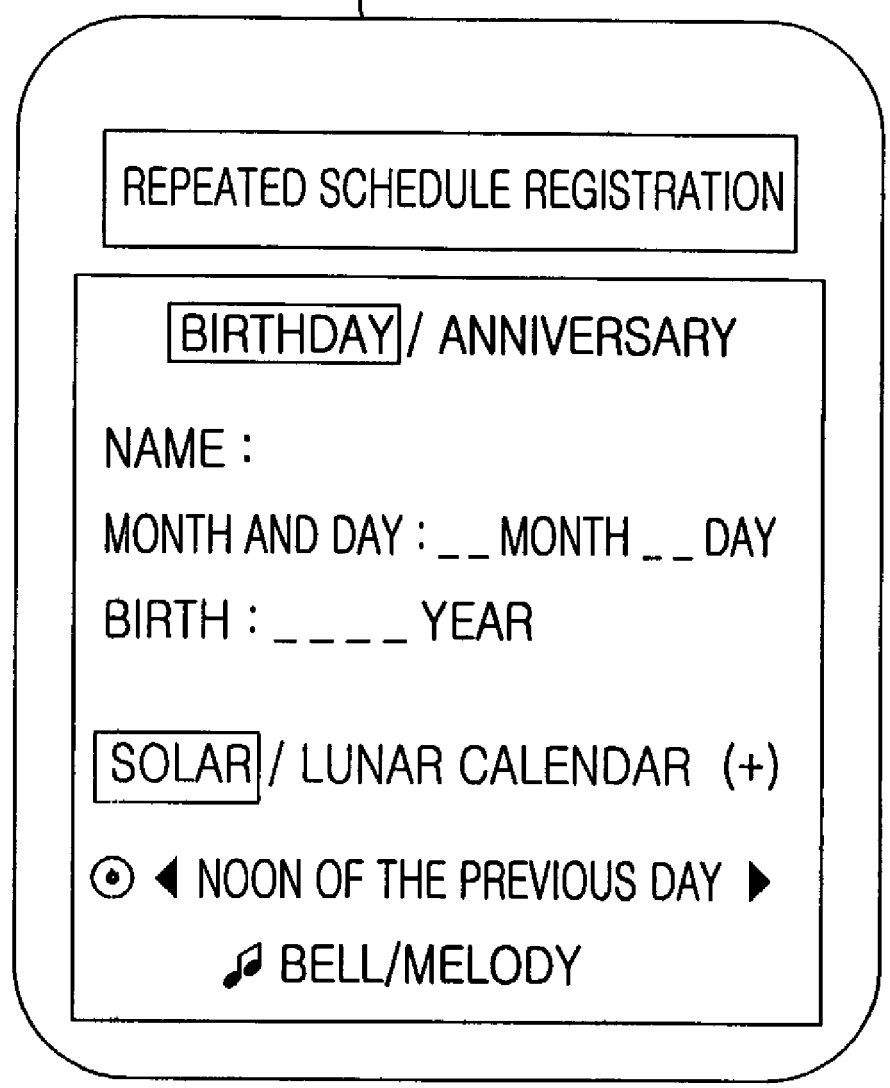
FIG. 3 is a view showing a display screen when the repeated schedule information is registered in accordance with the present invention.

A procedure of registering the repeated schedule information in accordance with the present invention will be described with reference to FIGS. 2 and 3. FIG. 2 is a flow chart describing a procedure of registering the repeated schedule information by the controller 10 in accordance with the present invention, and FIG. 3 is a view showing a display screen when the repeated schedule information is registered in accordance with the present invention.

Referring to FIG. 2, the controller 10 of the mobile communication terminal in a schedule management mode allows the display unit 40 to display the schedule management menu at step 101. The schedule management menu consists of registration, confirmation and cancel menus, among others, with respect to the general schedule and the repeated schedule. At step 103, if the user selects the repeated schedule registration menu, the controller 10 proceeds to step 105 and if the user selects another menu, the controller 10 proceeds to step 115. The controller 10 performs an operation corresponding to the selected menu at the above step 115.

The controller 10 allows a first display screen 81 to display a format of repeated schedule registration at the above step 105 and proceeds to step 107. In an embodiment of the present invention, when the repeated information is registered, the repeated schedule information is distinguished into birthdays and other anniversaries as shown in the first display screen 81 of FIG. 3. The user inputs the repeated schedule information into the mobile communication terminal on the basis of a display format. The controller 10 receives content information and date information for the repeated schedule from the user at step 107 and the controller 10 proceeds to step 109. The controller 10 receives alarm information related to an alarm generation time and an alarm sound selected by the user at the above step 109. The alarm generation time is produced on the basis of the date information for the repeated schedule. The repeated schedule information is divided into the content information and the date information. The content information is a repeated schedule description including names, appointment contents, anniversary contents where the repeated schedule is an anniversary, etc. The date information includes month, day, and solar calendar and lunar calendar indication information for the schedule information to be registered. In FIG. 3, the first display screen 81 has a space for inputting "birthday/anniversary" and "name" as the content information and a space for inputting "month and day", "year of person's birth" and "solar calendar indication (−) or lunar calendar indication (+)" as the date information. In an embodiment of the present invention, if the "birthday" is registered as the repeated schedule and then the "year of person's birth" is inputted by the user, the controller 10 calculates the age of the relevant person, and allows the display unit 40 to display the age of the relevant person when the schedule information is displayed in response to the schedule.

The user can select the alarm time among "noon of the previous day", "noon of the day", "midnight of the day", a specific alarm time, etc. on the basis of the inputted schedule date information. In the first display screen 81, the alarm time corresponds to "noon of the previous day". The alarm sound to be generated at the alarm time can be set using an icon of "bell/melody" shown on the first display screen 81.

After the above step 109 shown in FIG. 2, the controller 10 determines at step 111 whether the user presses a setting or store key and the controller 10 proceeds to step 113 if the user presses the setting key. At the above step 113, the controller 10 stores the content information and the date information inputted from the user in the memory 20 at the above step 107. Further, the controller 10 sets the alarm time and the alarm sound in response to the alarm information inputted from the user at the above step 109. Then, the controller 10 registers the repeated schedule information and completes the procedure of registering the repeated schedule information.

Figure 4:
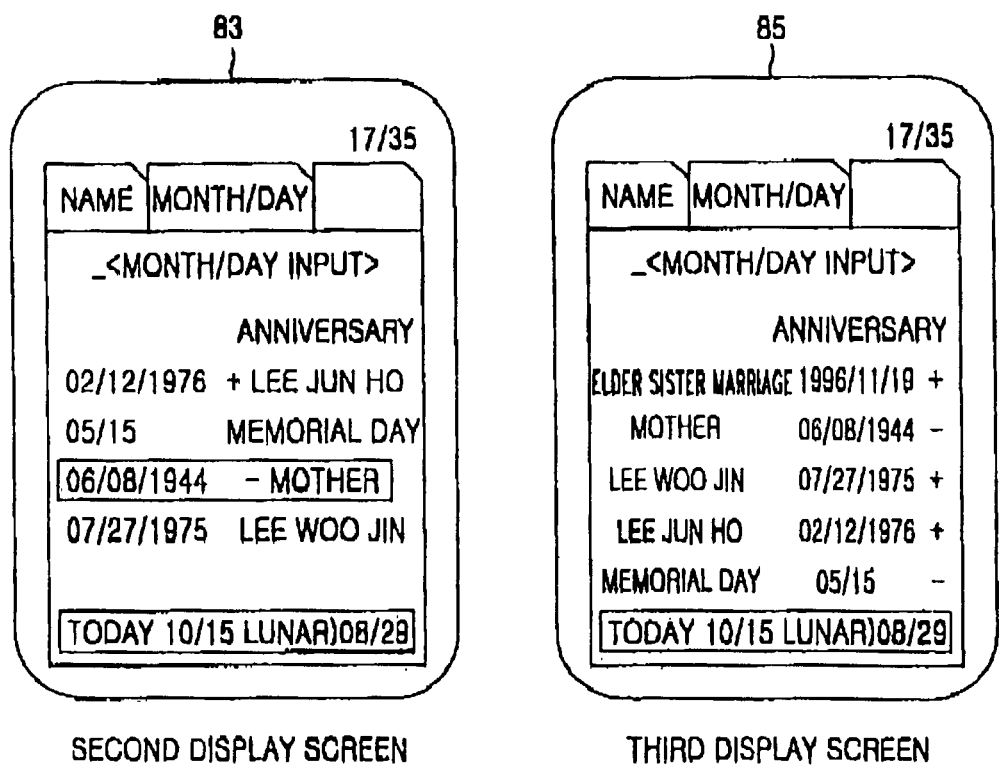
FIG. 4 is a view showing a display screen when the repeated schedule information is searched for in accordance with the present invention.

The registered repeated schedule information is arranged as shown in the display screens of FIG. 4 in response to a user's request, and the arranged display screen can be provided to the user. FIG. 4 is a view showing a display screen when the repeated schedule information is searched for in accordance with the present invention. If the user selects the repeated schedule confirmation menu, the date information of the registered repeated schedule information can be displayed in month/day order or the content information of the registered repeated schedule information can be displayed in alphabetical order. A second display screen 83 displays the date information of the registered repeated schedule information arranged in month/day order and a third display screen 85 displays the content information of the registered repeated schedule information arranged in alphabetical order. The user can conveniently confirm the registered repeated schedule information because the registered repeated schedule information is arranged on the basis of a predetermined reference.

The controller 10 checks whether the schedule information is registered and identifies a type of the schedule information. The controller 10 performs an operation according to the schedule registration and provides the registered schedule information to the user at the set alarm time. If the registered schedule information is repeated schedule information, the current time is compared with the month, day and hour data of the set alarm time. When the current time matches the month, day and hour data of the set alarm time, the alarm is generated and the repeated schedule information is provided to the user.

At this time, because the controller 10 compares the current time with only the month, day and hour data of the set alarm time, the repeated schedule information can be provided on the same data every year if the month, day and hour data is stored. On the other hand, if the schedule information is general schedule information, the current time is compared with the year, month, day and hour data of the set alarm time. When the current time matches the year, month, day and hour data of the set alarm time, the alarm is generated and the general schedule information is provided to the user.

When the schedule information is provided, the controller 10 searches for a list of telephone numbers and determines whether a name corresponding to the schedule information exists among names registered in the list of telephone numbers. Then, if the name corresponding to the schedule information exists among names registered in the list of telephone numbers, the controller 10 simultaneously provides telephone numbers related to the name and the schedule information. At this time, if a telephone number of the mobile communication terminal exists among the telephone numbers related to the name, the telephone number of the mobile communication terminal is dialed or a short message is created so that the created short message is transmitted using a short message creation menu in response to a user's selection. The controller 10 stores the schedule information in the memory 20 if the schedule information once provided to the user is repeated schedule information. Before the mobile communication terminal receives a schedule information deletion request from the user, the schedule information once provided to the user will be continuously provided to the user on the same date every year. However, the controller 10 deletes the schedule information if the schedule information once provided to the user is the general schedule information.

Figure 5A:
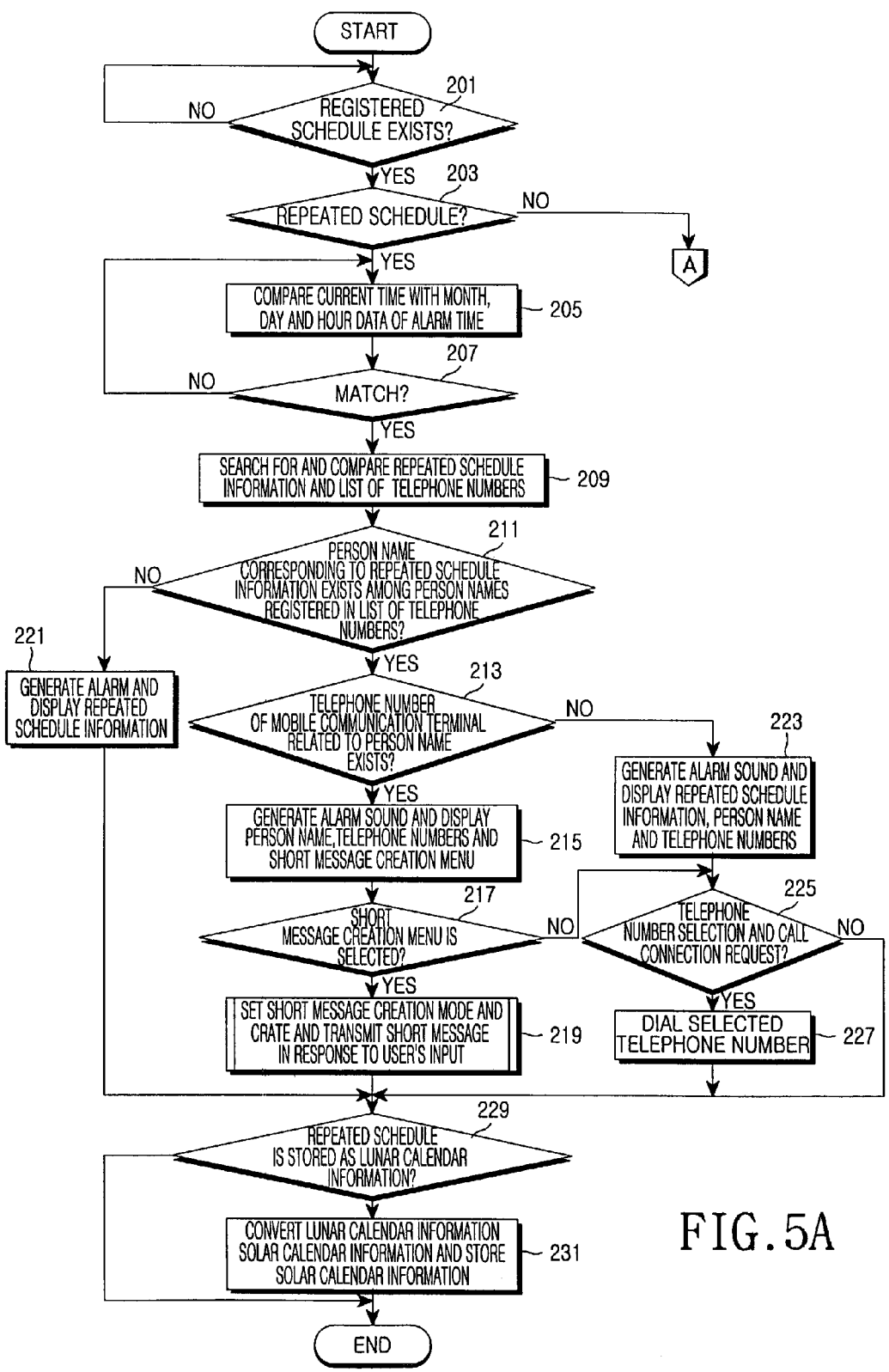
FIG. 5A is a flow chart describing a procedure of displaying the repeated schedule information registered by the controller in accordance with the present invention.
Figure 5B:
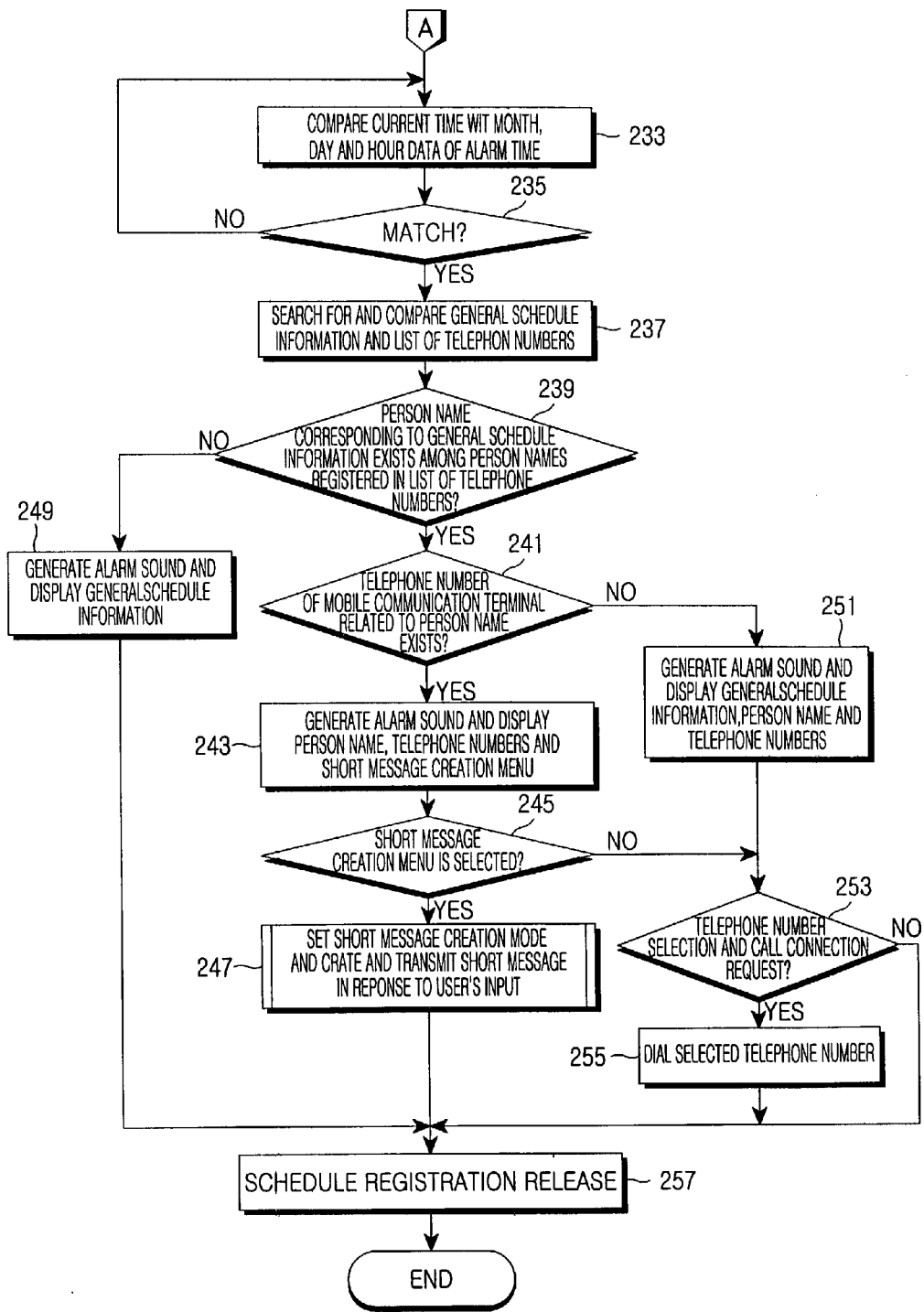
FIG. 5B is a flow chart describing a procedure of displaying general schedule information registered by the controller in accordance with the present invention.

A procedure of providing the schedule information is shown in FIGS. 5A and 5B. FIG. 5A is a flow chart describing a procedure of displaying the repeated schedule information registered by the controller 10 in accordance with the present invention. FIG. 5B is a flow chart describing a procedure of displaying the general schedule information registered by the controller 10 in accordance with the present invention. With reference to FIGS. 5A and 5B, an operation of the controller 10 will be described in detail below.

In FIG. 5A, the controller 10 determines at step 201 whether the schedule information is registered and proceeds to step 203 if the schedule is registered. Then, the controller 10 determines at the above step 203 whether the registered schedule information is repeated schedule information or general schedule information, and proceeds to the above step 205 if the registered schedule information is repeated schedule information. On the other hand, the controller 10 proceeds to step 233 shown in FIG. 5B if the registered schedule information is general schedule information. The controller 10 compares the current time with the month, day and hour data set as the alarm time of the repeated schedule information at the above step 205 and the controller 10 proceeds to step 207 to determine if the current time matches the month, day and hour data set as the alarm. The controller 10 proceeds to step 209 if the current time matches the month, day and hour data set as the alarm time of the repeated schedule information at the above step 207. On the other hand, the controller 10 proceeds to the above step 205 if the current time does not match the month, day and hour data set as the alarm time of the repeated schedule information. The controller 10 searches for the repeated schedule information and the list of telephone numbers stored in the memory 20 at the above step 209 and proceeds to step 211. The controller 10 determines at the above step 211 whether a name corresponding to the repeated schedule information exists among names registered in the list of telephone numbers. If the name corresponding to the repeated schedule information exists among names registered in the list of telephone numbers, the controller 10 proceeds to step 213. Otherwise, the controller 10 proceeds to the above step 221. In other words, the controller 10 searches for and compares the names registered in the list of telephone numbers and the content information inputted by the user when the repeated schedule information is registered. The controller 10 generates the alarm and allows the display unit 40 to display the repeated schedule information at the above 221 step. Then, the controller 10 proceeds to step 229. At this time, the repeated schedule information to be displayed includes the content information and the date information inputted by the user when the repeated schedule information is registered.

Figure 6:
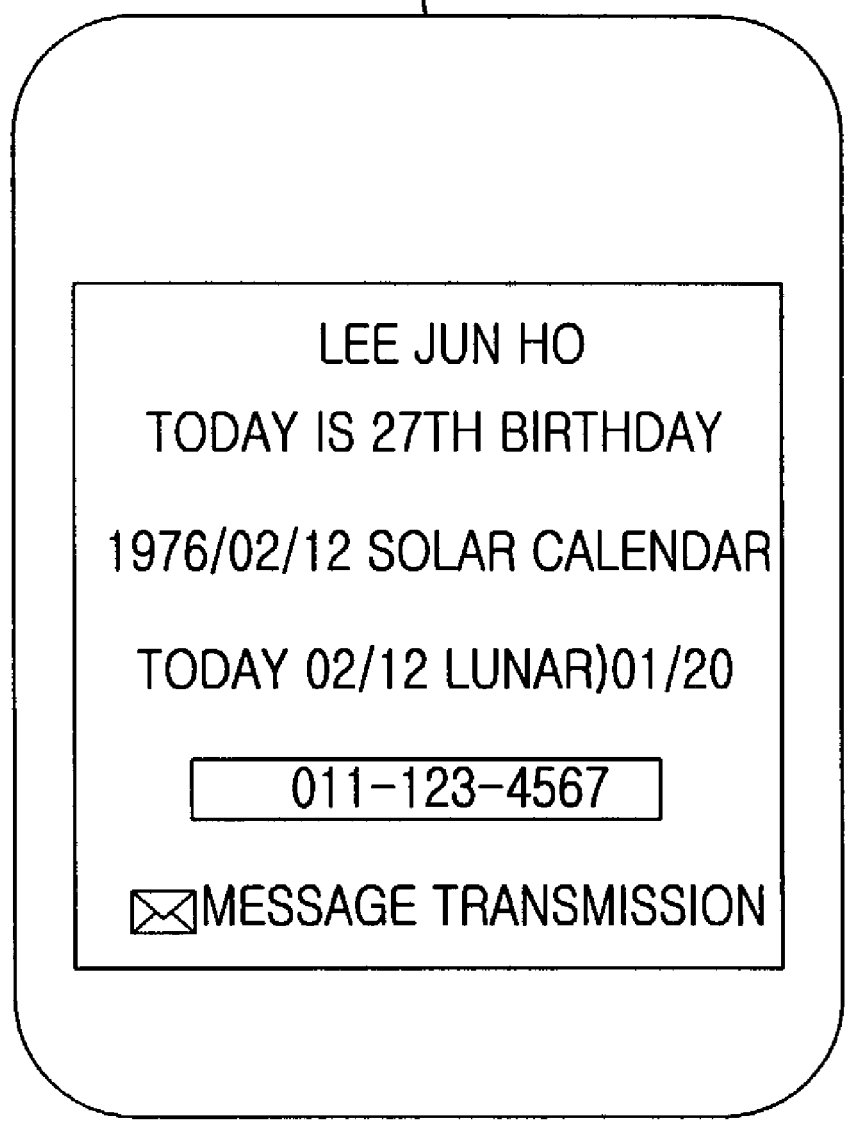
FIG. 6 is a view showing a display screen when the registered repeated schedule information is displayed in accordance with the present invention.

The controller 10 determines at step 213 whether a telephone number of a mobile communication terminal related to the name corresponding to the schedule information exists among telephone numbers registered in the list of telephone numbers. The controller 10 proceeds to step 215 if a telephone number of a mobile communication terminal corresponding to the schedule information exists. On the other hand, if a telephone number of a mobile communication terminal does not exist, the controller 10 proceeds to step 223. At the above step 215, the controller 10 generates the alarm sound and allows the display unit 40 to display the person name and the telephone numbers corresponding to the repeated schedule information and a short message creation menu on a fourth display screen 87 shown in FIG. 6. FIG. 6 is a view showing a display screen when the registered repeated schedule information is displayed in accordance with the present invention.

In FIG. 5A, the controller 10 determines at step 217 whether the user selects the short message creation menu. If the user selects the short message creation menu, the controller 10 proceeds to step 219. Otherwise, the controller 10 proceeds to step 225. Then, the controller 10 sets a short message creation mode at the above step 219 and creates the short message in response to the user input to transmit the displayed short message using the telephone number of the mobile communication terminal. The controller 10 determines at step 225 whether the user selects the telephone number and the user requests a call connection to the selected telephone number. If the user selects the telephone number and the user requests the call connection to the selected telephone number, the controller 10 proceeds to step 227. Otherwise, the controller 10 proceeds to step 229. The controller 10 dials the selected telephone number for the call connection at step 227 and proceeds to the above step 229.

If the telephone number of the mobile communication terminal does not exist in the list of telephone numbers registered at step 213, the controller 10 proceeds to step 223 and generates the alarm. Further, the controller 10 allows the display unit 40 to display the repeated schedule information and the telephone number related to the person name and the controller 10 proceeds to the above step 225. The controller 10 determines at the above step 225 whether the user enters a telephone number and the user requests a call connection to the entered telephone number. If the user enters the telephone number and the user requests the call connection to the entered telephone number, the controller 10 proceeds to the above step 227. Otherwise, the controller 10 proceeds to the above step 229. The controller 10 dials the entered telephone number for the call connection at the above step 227 and proceeds to the above step 229.

The controller 10 determines at step 229 whether the date information of the repeated schedule is stored as the lunar calendar information. If the date information of the repeated schedule information is stored as the lunar calendar information, the controller 10 proceeds to step 231. On the other hand, if the date information of the repeated schedule information is stored as the solar calendar information, the procedure of displaying the repeated schedule information is completed. The controller 10 converts the date information of the repeated schedule information to the solar calendar information of this year and stores the converted date information in the memory 20 at the above step 231 and the controller 10 completes the procedure of displaying the repeated schedule information. Because the repeated schedule information in accordance with the present invention is displayed on the same date every year, the date information is converted to the solar calendar information of this year and the converted date information is stored in the memory 20.

If the registered schedule information is general schedule information at step 203, the controller 10 proceeds to step 233 shown in FIG. 5B. The controller 10 compares the current time with the year, month, day and hour data of the alarm time at the above step 233 and proceeds to step 235. The controller 10 determines at the above step 235 whether the current time matches the year, month, day and hour data of the alarm time and proceeds to step 237. Otherwise, the controller 10 proceeds back to step 233. The controller 10 searches for the general schedule information and the list of telephone numbers and then proceeds to step 239. An operation procedure of the controller 10 of steps 239 to 255 is similar to that of steps 211 to 227. If telephone numbers corresponding to the name in the general schedule information exist in the list of telephone number, the controller 10 generates the alarm and allows the display unit 40 to display the general schedule information and the telephone numbers. Further, if a telephone number of the mobile communication terminal exists among the telephone numbers corresponding to the name in the general schedule information, the display unit 40 displays the telephone number of the mobile communication terminal along with the short message creation menu. Thereafter, the short message is created in response to the user selection and request, and the created short message is transmitted to the mobile communication terminal. Alternatively, the telephone number of the mobile communication terminal displayed is dialed.

When a procedure of displaying the general schedule information is completed, the controller 10 releases a general schedule registration at step 257.

According to the preferred embodiment of the present invention stated above, the present invention is to provide a method for managing schedule in a mobile communication terminal where if there is a name matching schedule information stored upon schedule registration among names recorded in the pre-stored telephone list, all the stored telephone numbers relative to the matched name are displayed simultaneously upon providing the schedule information, and a telephone number selected by the user among the displayed telephone numbers is dialed.

Further, according to an another embodiment of the present invention, it may be considered that upon providing the schedule information, only one telephone number relative to the schedule information is displayed. More particularly, the controller 10 determines whether there is a name matching the schedule information stored upon schedule registration among names recorded in the pre-stored telephone list. If the name exists, a representative telephone number among the telephone numbers related to the name is displayed. The representative telephone number is previously selected by the use when the schedule is registered. The controller 10 displays a short message creation menu if the displayed representative telephone number is the telephone number of a mobile communication terminal. Thereafter, the controller 10 dials the displayed representative telephone number or transmits a created short message to the displayed representative telephone number.

As apparent from the above description, the present invention provides a method for conveniently managing schedule information such as anniversaries to be repeated every year, thereby efficiently managing the schedule information. Further, the present invention provides a method capable of confirming telephone numbers of another party at the same time when the registered schedule information is confirmed, thereby conveniently making contact with the party. It is noted that the display images and screens shown and described herein are for example purposes and other screens and displays can be used.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for managing a schedule in a mobile communication terminal, comprising the steps of:
   a) registering schedule information according to a predetermined type;
   b) determining whether the registered schedule information exists;
   c) determining whether a current time matches an alarm generation time for the registered schedule information, and based upon the determination:
      determining whether the current time matches month, day and hour data of the alarm generation time set when the schedule information was registered, if the registered schedule information's type is repeated schedule information; and
      determining whether the current time matches year, month, day and hour data of the alarm generation time set when the schedule information was registered, if the registered schedule information's type is general schedule information;
   d) generating a pre-set alarm if the current time matches the alarm generation time;
   e) searching for a list of previously stored telephone numbers, and displaying the registered schedule information with more than one telephone number related to a name if the name corresponding to the registered schedule information exists among names registered in the list of telephone numbers; and
   f) dialing a telephone number selected by the user among the displayed telephone numbers.

2. The method as set forth in claim 1, further comprising the steps of:
   displaying simultaneously a short message creation menu if the telephone number of a mobile communication terminal exists among the displayed telephone numbers; and
   setting a short message creation mode if the user selects the short message creation menu and creating a short message in response to the user selection to transmit the created short message to the other mobile communication terminal.

3. The method as set forth in claim 1, wherein the step of determining whether the current time matches the year data of the alarm generation time set when the schedule information was registered is only performed if the registered schedule information's type is general schedule information.

4. A method for managing a schedule in a mobile communication terminal, comprising the steps of:
   a) registering schedule information including a name according to a predetermined type;
   b) determining whether the registered schedule information exists;
   c) determining whether a current time matches an alarm generation time for the registered schedule information, and based upon the determination:
      determining whether the current time matches month, day and hour data of the alarm generation time set when the schedule information was registered, if the registered schedule information's type is repeated schedule information; and
      determining whether the current time matches year, month, day and hour data of the alarm generation time set when the schedule information was registered, if the registered schedule information's type is general schedule information;
   d) generating a pre-set alarm if the current time matches the alarm generation time;
   e) searching for a list of previously stored telephone numbers, simultaneously displaying the registered schedule information and a telephone number related to the name if the name corresponding to the registered schedule information exists among names registered in the list of telephone numbers; and
   f) dialing the telephone number if a user selects a call connection.

5. The method as set forth in claim 4, further comprising the steps of:
   displaying a short message creation menu if the selected telephone number is the telephone number of another mobile communication terminal when the schedule information is displayed; and
   setting a short message creation mode if the user selects the short message creation menu, creating a short message in response to the user selection and transmitting the created short message to the other mobile communication terminal.

6. The method as set forth in claim 4, further comprising the step of:
   displaying only the schedule information if the name corresponding to the registered schedule information does not exist among the names registered in the list of telephone numbers.

7. The method as set forth in claim 4, wherein the repeated schedule information is the schedule information to be provided annually.

8. The method as set forth in claim 4, wherein the schedule information includes content information made up of schedule contents or names and schedule date information.

9. The method as set forth in claim 4, further comprising the steps of:
   storing the schedule information if the registered schedule information is repeated schedule information; and
   deleting the schedule information if the registered schedule information is general schedule information.

10. The method as set forth in claim 4, further comprising the step of:
    if the registered schedule information is repeated schedule information and date information of the repeated schedule information is lunar calendar information, converting the lunar calendar information to solar calendar information and storing the solar calendar information.

11. The method as set forth in claim 4, wherein step a) further comprises the steps of:
    storing the schedule information;
    setting the alarm generation time when the user inputs alarm time information so that the schedule information is provided to the user; and
    setting an alarm sound to be generated at the alarm generation time in response to an alarm sound selection selected by the user.

12. The method as set forth in claim 4, wherein the step of determining whether the current time matches the year data of the alarm generation time set when the schedule information was registered is only performed if the registered schedule information's type is general schedule information.

* * * * *